March 29, 1927.
B. T. JONES
SEPARATOR
Filed April 24, 1926  2 Sheets-Sheet 1
1,622,872
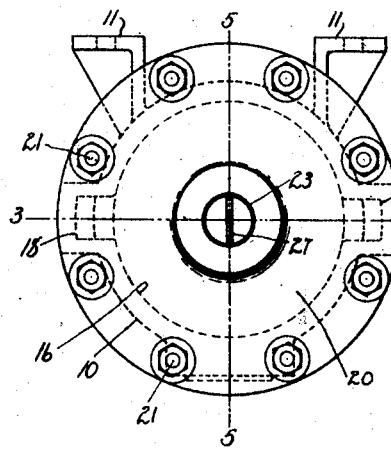
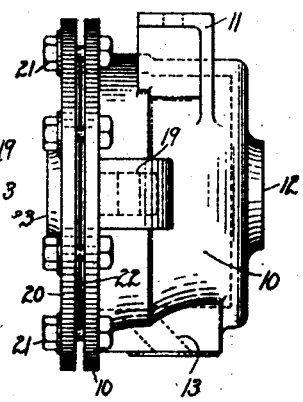
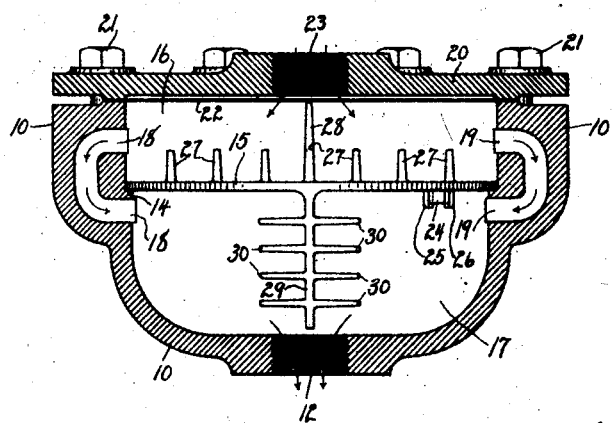

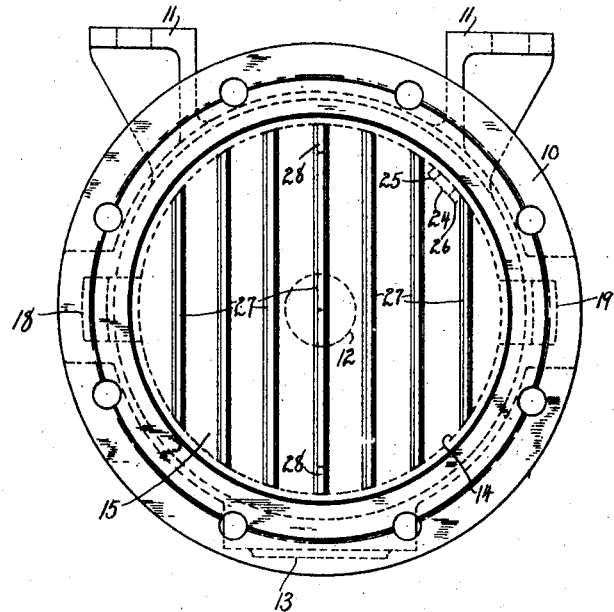

Patented Mar. 29, 1927.

1,622,872

UNITED STATES PATENT OFFICE.

BENJAMIN T. JONES, OF NEW HAVEN, CONNECTICUT.

SEPARATOR.

Application filed April 24, 1926. Serial No. 104,386.

Fig. 1 is a front view of a separator constructed in accordance with my invention;

Fig. 2 is a side view thereof;

Fig. 3 is a sectional view on the line 3—3 of Fig. 1;

Fig. 4 is a front view with the cap removed;

Fig. 5 is a sectional view on the line 5—5 of Fig. 1; Figs. 3, 4 and 5 being on an enlarged scale.

This invention relates to improvement in separators, and particularly to separators for separating moisture from compressed air, oil, steam, or gas, the object being to provide a simple device through which compressed air, steam, or gas may pass for use and which will collect and discharge oil or moisture at a point distinct from the main discharge, and the invention consists in the construction and arrangement of parts as hereinafter described and particularly recited in the claims.

In carrying out my invention, I employ a casing 10 provided with hangers or brackets 11 by which the device may be properly supported. The casing is cup-shaped and formed with an outlet 12 at the rear and escape-opening 13 at the bottom. Within the outer edge of the casing is an annular shoulder 14 on which is seated a separator-plate 15, dividing the casing into a front chamber 16 and a rear chamber 17, and on opposite sides are by-passes 18 and 19, which connect the two chambers. The front of the casing is closed by a cap 20, secured by bolts 21, and between the cover and casing is a high-pressure packing 22. In the center of the cap 20 is an inlet-opening 23. The separator-plate 15 may be held against turning by providing its underface with a lug 24 to enter between lugs 25 and 26 formed in the casing.

On the outer face of the casing are a series of vertically-arranged baffle-ribs 27 and, preferably, the central rib will be provided with projections 28 at its opposite ends to be engaged by the cap-plate, so as to hold the separator-plate on its seat. From the center of the back of the separator-plate is a rearward extension 29 provided upon its opposite faces with transverse-baffles 30. Air or gas from a compressor is admitted through the entrance-opening 23 in the cap-plate and, entering the front-chamber 16, its currents are broken by the baffles 27, and moisture in the compressed air will collect on these baffles, on which the moisture moves downward and is discharged through the escape-opening 13. The air then moves through the by-passes 18 and 19 into the rear chamber 17, where its currents are again broken by the baffles 30, which will catch and retain any moisture which has not been removed by the baffles in the front chamber. From this rear chamber 17 the air is discharged through the outlet 12 and is perfectly dry. If steam or gas is passed through the separator, any oil or moisture will be separated, so that the products discharged are of high active quality.

This device is simple to manufacture and can be introduced into any air, steam, or gas line and effectually separate the fluids passing through it.

I claim:

1. A separator, comprising a cup-shaped casing formed with an internal annular shoulder and at the rear with a discharge-opening and at the bottom with a drainage-opening, a baffle-plate removably-seated on said shoulder and formed with baffles, a cap secured to the edge of the casing and formed with a central inlet-opening, and a by-pass extending from front to rear of said baffle-plate.

2. A separator, comprising a cup-shaped casing formed with an internal annular shoulder and at the rear with a discharge-opening and at the bottom with a drainage-opening, a baffle-plate removably seated on said shoulder and formed with baffles, a cap secured to the edge of the casing and formed with a central inlet-opening, a by-pass extending from front to rear of said baffle-plate, and means for holding the plate against rotation.

3. A separator, comprising a casing formed with an internal annular shoulder and at the rear with a discharge-opening and at the bottom with a drainage-opening, a baffle-plate removably seated on said shoulder and formed with baffles, a cap secured to the edge of the casing and formed with a central inlet-opening, one of said baffles extended to be engaged by said cap, and a by-pass extending from front to rear of said baffle-plates.

4. A separator, comprising a cup-shaped casing formed with an internal annular shoulder and with an outlet at its rear and a drainage-opening at its bottom, a baffle-plate removably seated in the casing upon said shoulder, said baffle-plate formed on its front face with vertically-arranged baffles and on its rear face with a rearward vertical extension and transverse baffles thereon, a by-pass extending from the front of the baffle to the rear thereof, and a cap secured to the edge of said casing and formed with a central inlet-opening.

In testimony whereof, I have signed this specification.

BENJAMIN T. JONES.